(No Model.)
H. H. HEWITT.
JOURNAL BEARING.
No. 299,221. Patented May 27, 1884.
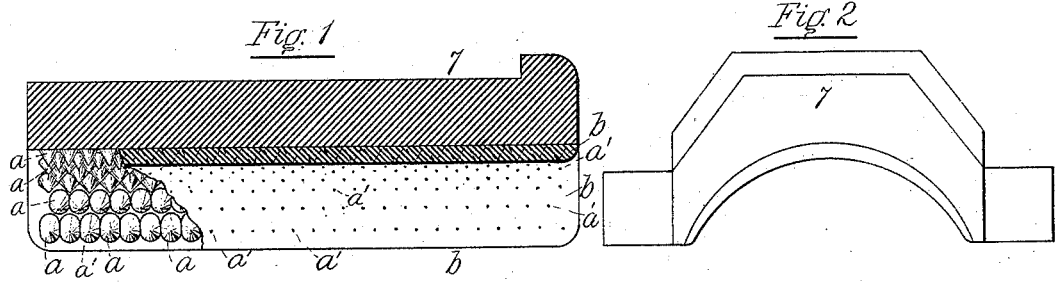
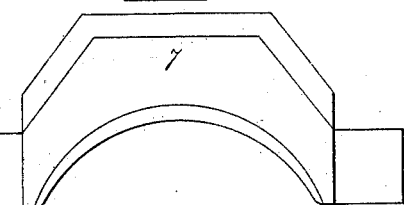
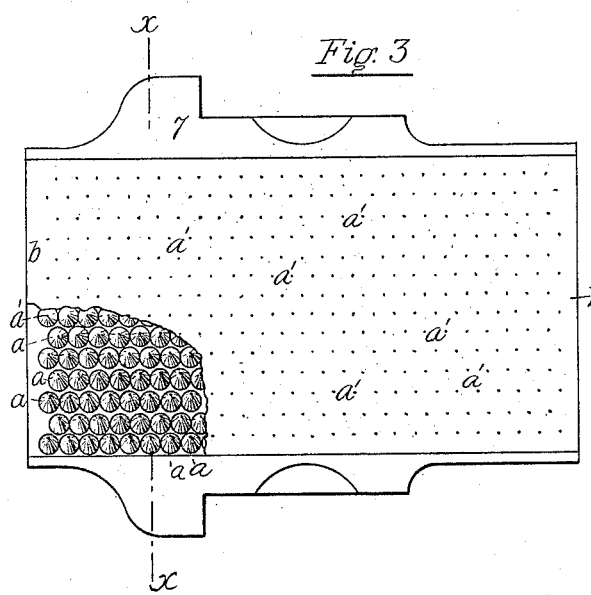
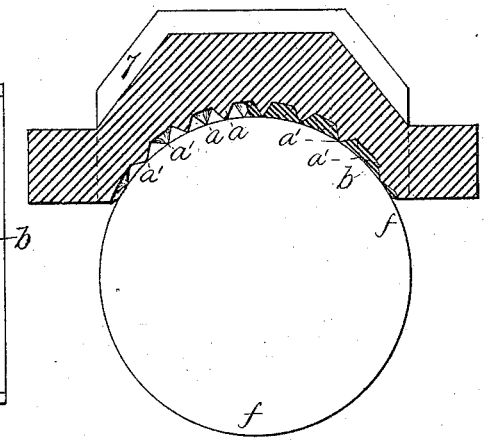
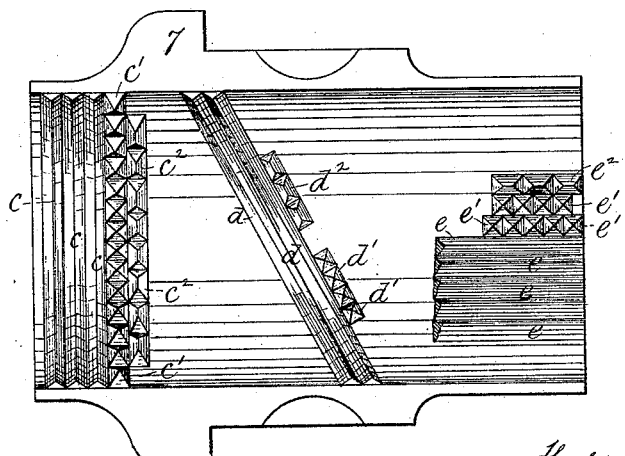
Witnesses.
H. D. Williams
C. J. Holcombe
Herbert H. Hewitt.
Inventor
per Alfred Shedlock.
Atty.

UNITED STATES PATENT OFFICE.

HERBERT H. HEWITT, OF NEW YORK, N. Y.

JOURNAL-BEARING.

SPECIFICATION forming part of Letters Patent No. 299,221, dated May 27, 1884.

Application filed February 19, 1884. (No model.)

*To all whom it may concern:*

Be it known that I, HERBERT H. HEWITT, a citizen of the United States, and a resident of New York, county and State of New York, have invented certain new and useful Improvements in Journal-Bearings, of which the following is a specification.

My invention relates to journal-bearings; and it consists of a hard-metal bearing-block provided with a series of taper projections on its bearing side, in combination with a soft-metal lining applied so as to surround the said taper projections and constitute the bearing-surface. The taper projections on the bearing-block may be either conical or pyramidal in form, or consist of elongated ridges having sharp edges, the points of the projections or sharp edges of the ridges being in a curved plane corresponding to the bearing-surface of the journal, and the soft-metal lining fills up the interstices between and entirely surrounds the pointed or sharp-edged projections, its exposed surface conforming to that of the journal. When the points or sharp edges of the taper projections are even with the soft-metal lining, they bear a certain amount of the load, and the projections will be thereby compressed should there be any inequalities in the bearing-surface, and so, by reason of their taper form, force up the soft-metal lining uniformly in close contact with the surface of the journal. As the bearing wears away, the hard metal alone eventually constitutes the bearing-surface; but the transition from a soft to a hard metal bearing is in this case very gradual, because the surface of the hard-metal projections in contact with the journal increases as that of the soft-metal decreases, thus always insuring a perfect uniform fit of the journal in the bearing, and removing therefrom all danger of heating. The hard-metal bearing is, by this construction, in no way weakened, and by reason of the taper projections penetrating into or through the soft-metal lining, both the longitudinal and lateral displacement of the same, when under heavy pressure, are entirely avoided. But to describe my invention more particularly, I will refer to the accompanying drawings, in which—

Figure 1 is a longitudinal section of my improved journal-bearing, showing the soft-metal lining partly removed. Fig. 2 is an end view of the same. Fig. 3 is an inverted plan showing the soft-metal lining partly removed. Fig. 4 is a transverse section on the line $x\,x$, Fig. 3, and Fig. 5 is illustrative of modifications in the form of the projections on the bearing-block.

The hard-metal bearing-block 7 is of the ordinary form as used with car-axle journals; but to adapt it for use according to my invention it is provided on its under side with a series of conical projections, $a\,a$, whose points $a'\,a'$ are in a curved plane, so as to come in contact with the journal, (shown by the circle $f$ in Fig. 4.) These projections $a\,a$ are so arranged that as few as possible are in any one plane at right angles to the axis of rotation of the journal, and they are preferably formed by being cast on and with the bearing-block 7, thereby keeping the cost of construction at a minimum.

The soft-metal lining $b$ may be cast in a mold of the desired shape, and with holes formed therein corresponding to the conical projections $a\,a$, and afterward applied to the hard-metal bearing-block 7; but, in combining the soft-metal lining $b$ with the bearing-block 7, I prefer to adopt the old well-known method of applying babbit and similar linings to brasses of bearings—viz., by placing the bearing-block against a core corresponding in size to the journal, and pouring the soft metal between them to form the bearing-surface, the surface of the bearing-block covered by the taper projections being so prepared that the soft-metal lining will adhere firmly thereto.

It will be observed that the conical projections $a\,a$ so interlock with the body of the soft-metal lining $b$ that it cannot flow or be displaced, either in a longitudinal or lateral direction, under whatever pressure it may be subjected to; and that all liability to heating, due to an uneven pressure of the journal on the different parts of the bearing-surface, is obviated, for the reason that the conical projections are not sufficiently strong to take the load, and are consequently crushed where they bear hard on the journal, thereby forcing up the soft metal $b$ in close contact with the journal, so that when the journal-bearing is first applied a perfect uniform fit on the journal is provided. As the bearing wears away, the journal eventually works against the hard-metal bearing-block 7; but the taper form of the projections cause the change from a soft to a hard metal bearing to be a very gradual one, thereby insuring a perfect fit of the journal in the hard-metal bearing.

I wish it understood that although I have described the taper projections as being conical in form, which is perhaps the best form to adopt in practice, I do not restrict myself closely to such form, nor to the particular arrangement and grouping of the projections. They may be sharp-edged ridges arranged transversely in the bearing, as shown at $c$, Fig. 5, or diagonally, as shown at $d$, or longitudinally, as shown at $e$; or they may consist of pyramids or elongated pyramids, arranged as shown, respectively, at $c'$ $d'$ $e'$, and at $c^2$, $d^2$, and $e^2$.

What I claim, and desire to secure by Letters Patent, is—

1. A journal-bearing of brass or hard metal, the bearing side of which consists of taper projections integral therewith, in combination with a soft-metal lining surrounding the said projections, substantially as and for the purpose set forth.

2. A journal-bearing of hard and soft metal, the bearing-surface of which is composed of the soft-metal and projecting points or edges forming parts of and extending from the hard metal entirely through the soft metal, substantially as and for the purpose set forth.

3. In a journal-bearing, a hard-metal bearing-block provided on its bearing side with a series of conical projections integral therewith, in combination with a soft-metal lining covering the said conical projections, substantially as described.

In testimony whereof I have hereunto set my hand, at New York, county and State of New York, this 16th day of February, A. D. 1884.

HERBERT H. HEWITT.

Witnesses:
ALFRED SHEDLOCK,
H. D. WILLIAMS.